US 7,809,885 B2

(12) United States Patent
Biessener et al.

(10) Patent No.: US 7,809,885 B2
(45) Date of Patent: Oct. 5, 2010

(54) SCALABLE HARD-DRIVE REPLICATOR

(75) Inventors: David W. Biessener, Woodbury, MN (US); Daniel G. Kuechle, Ramsey, MN (US)

(73) Assignee: Voom Technologies, Inc., Lakeland, MN (US)

( * ) Notice: Subject to any disclaimer, the term of this patent is extended or adjusted under 35 U.S.C. 154(b) by 630 days.

(21) Appl. No.: 11/541,250

(22) Filed: Sep. 29, 2006

(65) Prior Publication Data

US 2008/0082741 A1 Apr. 3, 2008

(51) Int. Cl.
G06F 12/00 (2006.01)
G06F 13/00 (2006.01)
G06F 13/28 (2006.01)
(52) U.S. Cl. ...................... 711/114; 711/162
(58) Field of Classification Search ............. 711/112, 711/114, 162
See application file for complete search history.

(56) References Cited

U.S. PATENT DOCUMENTS 6,131,141 A * 10/2000 Ravid ..................... 711/112
7,035,972 B2 * 4/2006 Guha et al. .............. 711/114
2005/0050275 A1 * 3/2005 Yagisawa et al. ......... 711/114
2005/0193181 A1 * 9/2005 Kaneda et al. ........... 711/162
2008/0016302 A1 * 1/2008 Wang et al. ............. 711/162

* cited by examiner

*Primary Examiner*—Christian P Chace
*Assistant Examiner*—Ryan Bertram
(74) *Attorney, Agent, or Firm*—Shumaker & Sieffert, P.A.

(57) ABSTRACT

In general, the invention is directed to techniques of scalable replication of data in persistent or volatile data storage devices. In particular, a computing device comprises a host acting as a device host for a data storage device and a plurality of data storage devices capable of persistent storage of data. A data storage replication component in the computing device acts as a data storage device. This data storage replication component comprises a device interface and a plurality of host interfaces. Each of the host interfaces acts as a device host for one or more data storage devices in the plurality of data storage devices. The primary data storage replication component may cause instructions (e.g., read, write, and control instructions) and data received from the host to be replicated on each data storage device in the plurality of data storage devices.

20 Claims, 5 Drawing Sheets

SCALABLE HARD-DRIVE REPLICATOR

TECHNICAL FIELD

The invention relates to computer data storage devices and, in particular, replication of storage media.

BACKGROUND

A hard-drive replicator is a device that produces an exact copy (i.e., a "replica") of a hard-drive. Conventional replicators, also referred to as hard-drive duplicators, are mainly self-contained, stand-alone devices having a number of drive bays. For example, a typical hard-drive replicator may include a drive bay to receive a source drive and two or four bays to receive target drives. When activated, the replicator copies data from the source drive to the target drive.

The stand-alone nature of conventional duplicators provides limited scalability. Moreover, the stand-alone duplicators require operator knowledge of the duplication system and require that the source drive be installed within the duplicator.

SUMMARY

In general, the invention is directed to scalable techniques for creating replicas of a source storage medium, such as a hard disk, flash drive, or other drive. A replicator device is described herein that can be operated as a stand-alone duplicator or in a configuration where the replicator is coupled to a host computer. From the perspective of the host, the replicator appears as a single data storage device. The replicator includes a plurality of host interfaces each of which may act as a host to one or more independent data storage busses. One or more target data storage devices may be coupled to each of these independent busses. The replicator operates to produce replicas of the source drive that is coupled to the host computer.

If one or more of the target data storage devices is replaced with another replicator, a hierarchical, tree-like system may be formed where the host computer serves as a root of the tree, the replicator devices serve as intermediate nodes within the tree, and the target data storage devices serve as leaf nodes. Data may be written from the host device through the replicators to the data storage devices, thus concurrently producing replicas of the source drive. In this way, the invention may achieve scalable, mass replication of electronic information.

For example, the host computing device may act as a storage "host" and the data storage replication component mimics the behavior of a conventional storage "device." The host may consider the data storage replication component to be a single data storage device, like a hard disk drive. However, additional independent busses (e.g., Small Computer System Interface busses, Advanced Technology Attachment busses, etc.) may connect the data storage replication component to one or more additional data storage devices. Thus, from the perspective of the data storage devices, the replicator mimics the behavior of a "host" and the additional data storage devices operate as conventional data storage devices. When the data storage replication component (i.e., the replicator) receives an instruction from the host to write electronic information, the data storage replication component may cause each host interface in the data storage replication component to concurrently write the electronic information to the data storage devices that are coupled to the host interfaces.

In one embodiment, a data replication system comprises a host to output data, a plurality of data storage devices capable of persistent storage of the data, and a data storage replication component. The data storage replication component comprises: (i) a primary interface programmable to mimic behavior of a data storage device to receive the data from the host data storage device; (ii) a plurality of host interfaces, wherein each of the host interfaces mimics behavior of a host for outputting the data to the plurality of data storage devices; and (iii) an internal interconnect for communication between the primary interface and each of the host interfaces. The system further comprises an interconnect to facilitate communication between the host and the primary interface of the data storage replication component. The data storage replication component replicates the data received from the primary interface to each data storage device in the plurality of data storage devices.

In another embodiment, the invention is directed to a method for replicating a source data storage device. The method comprises executing a backup software application on a host to read data from the source data storage device and to output the data. The method further comprises receiving the data from the host using a primary interface of a data storage replication component that appears to the host as a data storage device. The method also comprises communicating the data from the primary interface to a plurality of host interfaces on the data storage replication component via an internal interconnect. The host interfaces of the data storage replication component are coupled to a plurality of different data storage devices by respective independent data storage busses. The method further comprises concurrently writing the data from the plurality of host interfaces to the plurality of persistent data storage devices via independent data storage busses to produce a plurality of replicas of the source data storage device.

In another embodiment, the invention is directed to a data storage replication component comprising a primary interface, a plurality of host interfaces, and an internal interconnect. The primary interface is programmable in a first mode to mimic behavior of a data storage device that is capable of receiving data from a host data storage device for replication and in a second mode to mimic behavior of a host that is capable of operating as a source of data to be replicated. Each of the host interfaces mimics behavior of a host that is capable of outputting the data to a plurality of data storage devices. The internal interconnect couples the primary interface to each of the host interfaces.

The details of one or more embodiments of the invention are set forth in the accompanying drawings and the description below. Other features, objects, and advantages of the invention will be apparent from the description and drawings, and, from the claims.

DETAILED DESCRIPTION

Figure 1:
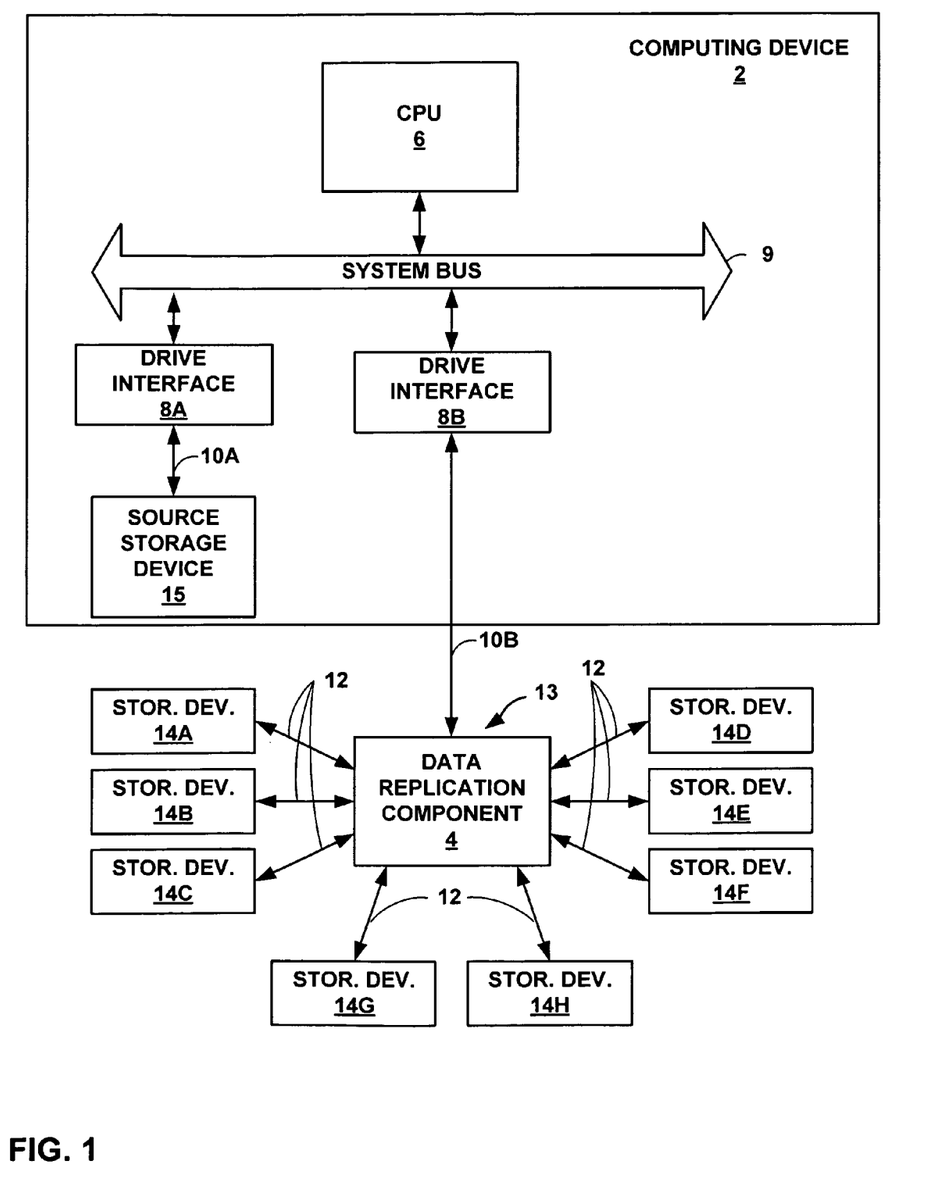
FIG. 1 is a block diagram illustrating an exemplary embodiment of a computing device having a scalable data storage replication component.

FIG. 1 is a block diagram illustrating an exemplary embodiment of a computing device 2 having a scalable data storage replication component 4, also referred to herein as a "replicator." Computing device 2 includes at least one central processing unit (CPU) 6 coupled via a system bus 9 to two drive interfaces 8A and 8B. CPU 6 may be a microprocessor, an application-specific integrated circuit (ASIC), an application-specific control unit, or other processing component. In addition, computing device 2 may be a dedicated duplication device, such as the HardCopy duplication device available from Voom Technologies, Inc. of Lakeland, Minn. Drive interfaces 8A and 8B may be conventional Input/Output (I/O) interfaces having logic for communicating with a hard-drive or other data storage devices with respective I/O busses 10. Computing device 2 may be a storage server, a workstation, a personal computer, a laptop computer, a hand-held device, a portable music player, a gaming platform, a network appliance, and so on. Alternatively, computing device 2 may be a specialized hardware component having a chassis configured to receive a source data storage device 15 (such as a hard-drive, CD, solid state device, or other data storage device) and a plurality of target data storage devices 14A-14H. Data storage replication component 4 may be a board, card, or other type of hardware component physically located within the housing of computing device 2. Alternatively, data storage replication component 4 and data storage devices 14 may be external to computing device 2 and coupled by way of a conventional drive interface 8B.

System bus 9 and I/O busses 10 facilitate communication between source data storage device 15, data storage replication component 4, and CPU 6. I/O busses 10 may be any of a variety of standard I/O busses, such as parallel Advanced Technology Attachment (ATA) or Serial Advanced Technology Attachment (SATA) busses, SCSI busses, a Peripheral Component Interconnect (PCI) interconnection, and so on. Moreover, I/O busses 10 need not be of the same type.

In computing device 2, drive interfaces 8 act as "hosts" for devices attached to I/O busses 10. In other words, drive interfaces 8 issue instructions to devices attached to I/O busses 10 and control traffic on System bus 9 and I/O busses 10. For example, assuming I/O bus 10B is a SCSI bus, drive interface 8B may contain logic that receives instructions from CPU 6 and outputs SCSI instructions for transmission to data storage replication component 4 via I/O bus 10B.

Data storage replication component 4 includes a primary interface 13 coupled to I/O bus 10B. Drive interface 8B may issue instructions to data storage replication component 4 in accordance with a defined data storage standard (e.g., SCSI, ATA-Packet Interface, ATA, or SATA) as though data storage replication component 4 were a data storage device, such as a hard disk drive. Data storage replication component 4 mimics the behavior of a device in conformance to the applicable standard so that, from the perspective of drive interface 8B, data storage replication component 4 appears as a single data storage device. For example, data storage replication component 4 may respond to instructions from drive interface 8B as though data storage replication component 4 were, in fact, a conventional data storage device.

Data storage replication component 4 includes additional host interfaces (not shown in FIG. 1) for coupling to device interconnects 12. Device interconnects 12 facilitate communication between data storage replication component 4 and data storage devices 14A through 14H, (collectively, data storage devices 14). Like device bus 10, device busses 12 may be parallel ATA or SATA busses, SCSI busses, ATA-Packet Interface (ATAPI) busses, or otherwise. Moreover, not all of device interconnects 12 need to be of the same interconnect type. For instance, the device interconnect between data storage device 14A and data storage replication component 4 may be a SCSI bus while the device interconnect between data storage device 14B and data storage replication component 4 may be an ATA bus. Also, it should be understood that not all data storage devices 14 need to be of the same type of data storage device. For instance, data storage device 14A may be a hard-disk drive, while data storage device 14B may be a compact flash memory drive, a Redundant Array of Independent Devices (RAID), a floppy drive, a SSD, a tape drive, and so on.

Data storage replication component 4 utilizes its host interfaces to control communications within the respective device interconnects 12. In other words, each of device interconnects 12 is coupled to a host interface included within data storage replication component 4 and each host interface mimics the behavior of a host with respect to the particular type of bus interface. For example, data storage replication component 4 may issue storage instructions to concurrently access data storage devices 14 through device interconnects 12.

In the exemplary embodiment shown in FIG. 1, data storage replication component 4 replicates data storage instructions (e.g., write instructions, read instructions, control instructions, etc.) and data received from drive interface 8B in data storage devices 14. Data storage replication component 4 may replicate the instructions in a substantially simultaneous or in a serial fashion. For example, data storage replication component 4 may forward write instructions from drive interface 8B to each of data storage devices 14 for concurrent execution of the write instructions. As another example, data storage replication component 4 may serially forward read instructions from device interface 8B to each of data storage devices 14 for serial execution of the read instructions. Control instructions may include instructions to inspect or change drive settings, permissions, configurations, and so on.

Because data storage replication component 4 replicates data storage instructions, a backup software application executed by CPU 6 may backup all or a portion of source data storage device 15 to data storage replication component 4, as if data storage replication component 4 were a single, target data storage device. However, data storage replication component 4 may, in fact, replicate and forward data storage instructions and data to all or a subset of the data storage devices 14 for concurrent or serial execution. In this manner, each of data storage devices 14, or a subset thereof, may be controlled to concurrently replicate data from source data storage device 15, thereby providing a system for replicating source data storage device 15 to a plurality of different data storage devices 14.

In addition, data replication component 4 may perform a function to initialize storage devices 14. In other words, data replication component 4 may delete all information previously stored in storage devices 14. For example, data replication component 4 may repeatedly write a pattern to storage devices 14 until the pattern fills storage devices 14. In this case, data replication component 4 may originate the pattern without input from computing device 2. For instance, data replication component 4 may initialize storage devices 14 when a user of data replication component 4 presses a button on a housing of data replication component 4.

The data replication architecture of FIG. 1 may provide one or more advantages. For example, because data storage replication component 4 forwards write instructions from drive interface 8B to each of data storage devices 14 at substantially the same time, data storage devices 14 write the data in parallel. Thus, it may take substantially the same time to write to one of data storage devices 14 that it takes to write to all eight of data storage devices 14. Further, because each of data storage devices 14 contains the same data, computing device 2 may continue to function normally so long as at least one of data storage devices 14 has not failed. Computing device 2 may have the further advantage that data storage devices 14 may be swapped in or swapped out without reconfiguring drive interface 8B.

Computing device 2 may also provide several advantages stemming from the fact that device interconnects 12 may differ from one another. For example, data storage replication component 4 may ensure that data is copied to SCSI and ATA devices, thereby providing for mass distribution of the data using different types of drives. Moreover, if one or more of the data storage devices is replaced with another replicator device, as discussed further below, a hierarchical, tree-like configuration may be formed where source data storage device 15 serves as the root of the tree and the leaf nodes are data storage devices 14 coupled to the intermediate replicator devices. In this way, the invention may achieve scalable, mass replication of all or a portion of a storage medium for distribution. Further, in certain embodiments, the described architecture may allow conventional source-to-target backup software to be used in the context of large-scale data replication.

Figure 2:
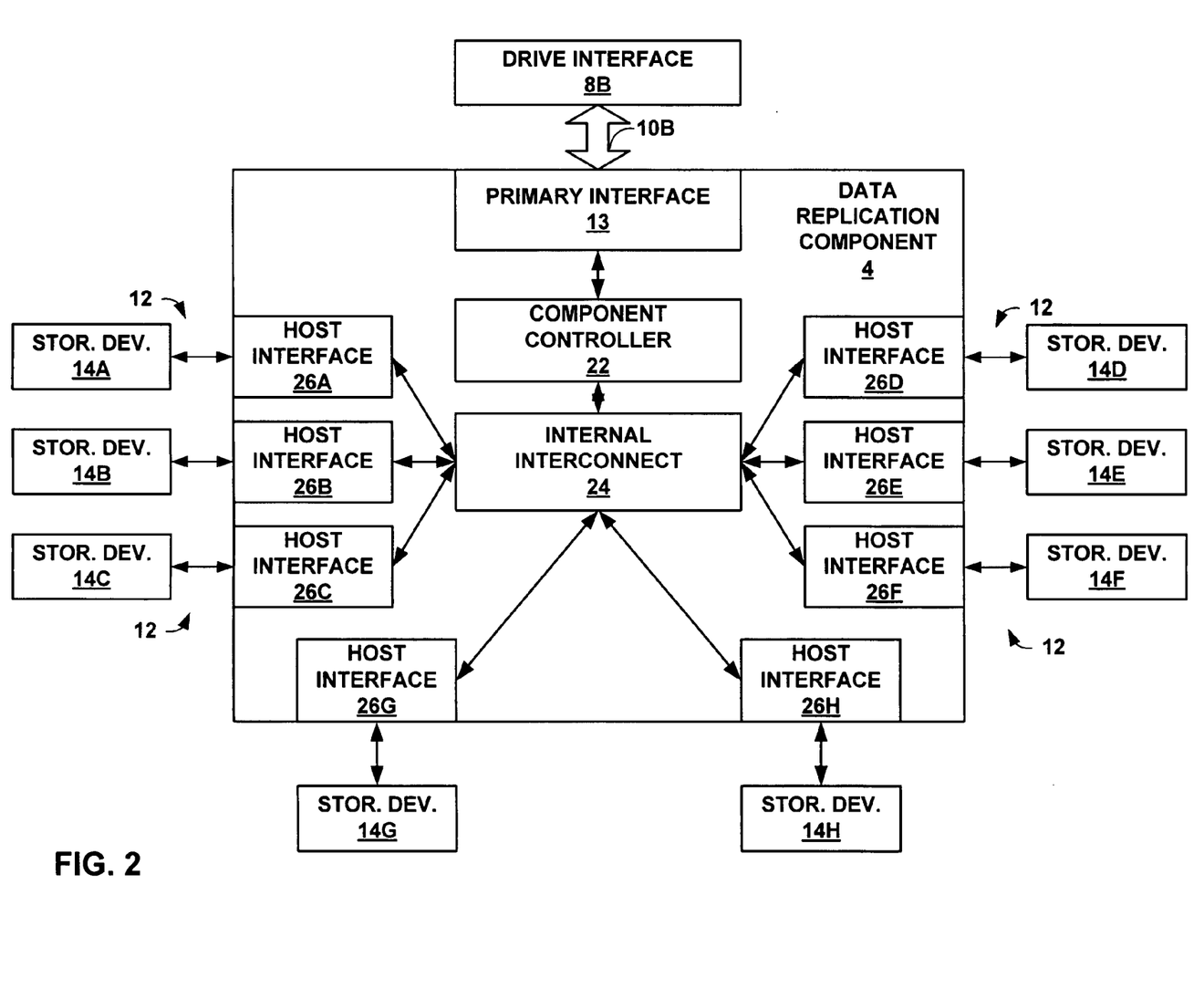
FIG. 2 is a block diagram illustrating an exemplary embodiment of a data storage replication component.

FIG. 2 is a block diagram illustrating an exemplary embodiment of a data storage replication component. In the exemplary embodiment illustrated in FIG. 2, data storage replication component 4 comprises a primary interface 13. Primary interface 13 is programmable to operate in one of two modes: (1) a first mode that mimics a data storage device and (2) a second mode that mimics a host. In the embodiment shown in FIG. 2, primary interface 13 is coupled to I/O bus 10B. In this example, primary interface 13 of data storage replication component 4 is programmed to mimic a data storage device, thereby allowing the data storage replication component to receive instructions from drive interface 8B of computing device 2.

Upon receiving an instruction from drive interface 8B, primary interface 13 transmits the instruction to a component controller 22. Component controller 22 may be a programmable ASIC, general-purpose microprocessor, or control logic embedded within data storage replication component 4. Component controller 22 may convert the instructions in an interconnect format of I/O bus 10B into one or more instructions in an interconnect format of an internal interconnect 24 within data storage replication component 4.

Internal interconnect 24 provides an internal bus structure having one or more busses of various types by which component controller 22 communicates with a plurality of hosts interfaces 26. For example, internal interconnect 24 may be a SCSI bus in parallel with a SATA bus, thereby allowing component controller 22 to output instructions of different formats concurrently. In this example, component controller 22 transmits instructions from primary interface 13 through the SCSI bus of internal interconnect 24 as well as the SATA bus of internal interconnect 24.

In some configurations, component controller 22 may act as an independent device host. In other words, component controller 22 may act as a source of data storage instructions for other devices via internal interconnect 24. This allows data storage replication component 4 to include internal data storage or be directly coupled to a data storage that operates as a source for data to be replicated.

In another configuration, when primary interface 13 is acting as a host interface, component controller 22 may send instructions to devices via primary interface 13. In this embodiment, data storage replication component 4 effectively includes nine host interfaces that may direct data to be replicated to corresponding data storage devices 14. Host interfaces 26A through 26H (collectively, host interfaces 26) receive all instructions sent on internal interconnect 24. Thus, if component controller 22 outputs a "write" instruction to internal interconnect 24, each of host interfaces 26 receives the write instruction so as to initiate parallel writing of data to data storage devices 14. Furthermore, because internal interconnect 24 may include a plurality of busses, host interfaces 26 may receive instructions of different types and, optionally, at substantially the same time.

Each of host interfaces 26 operates to mimic the behavior of a host device for a respective one of independent interconnects 12. For example, host interface 26A acts as a host on an independent device interconnect 12 (e.g., I/O bus) connecting data storage replication component 4 with data storage device 14A. Thus, from the perspective of data storage device 14A, host interface 26A is the originator of instructions on the interconnect between data storage device 14A and host interface 26A.

Because interconnects 12 may be of different formats (e.g., SCSI, SATA, ATA, etc.) each of host interfaces 26 may be programmed to convert information from an interconnect format of internal interconnect 24 into a interconnect format used in the corresponding one of interconnects 12 and vice versa. For instance, host interface 26B may be programmed to convert information from a parallel ATA bus in internal interconnect 24 into information for transmission on a SATA bus.

In some embodiments, internal interconnect 24 includes an asynchronous register access path and a synchronous data path. The asynchronous register access path may include a 16-bit bi-direction data bus, an 8-bit address bus, a 6-bit control bus, and a 4-bit disk address bus. The synchronous data path may include a 16-bit Direct Memory Access (DMA) bus, four control signals, and a common clock. The 4-bit disk address bus of the asynchronous register access path may allow component controller 22 to select a single one of storage devices 14 for read instructions and one or all of storage devices 14 for write instructions.

Component controller 22 may include a data queue for each of storage devices 14. Each of the data queues are associated with flags to indicate whether the respective data queue is full. In some embodiments, component controller 22 only performs write instructions when the flags associated with the data queues indicate that there is sufficient space in all of the data queues to store the write instructions.

To remove previous information from storage devices 14 (i.e., to "wipe" storage devices 14), component controller 22 may insert instructions to write an arbitrary data pattern into the data queues of each of storage devices 14. It is not necessary for component controller 22 to receive the instructions to write an arbitrary data pattern from computing device 2 nor is it necessary for component controller 22 to read these instructions from a source drive or memory. The flags of the data queues may then be set to never indicate that the respective data queues are full or empty. After component controller 22 sets the flags, component controller 22 may send write instructions in the data queues to storage devices 14. As a result, the arbitrary data pattern is written to storage devices 14.

Figure 3:
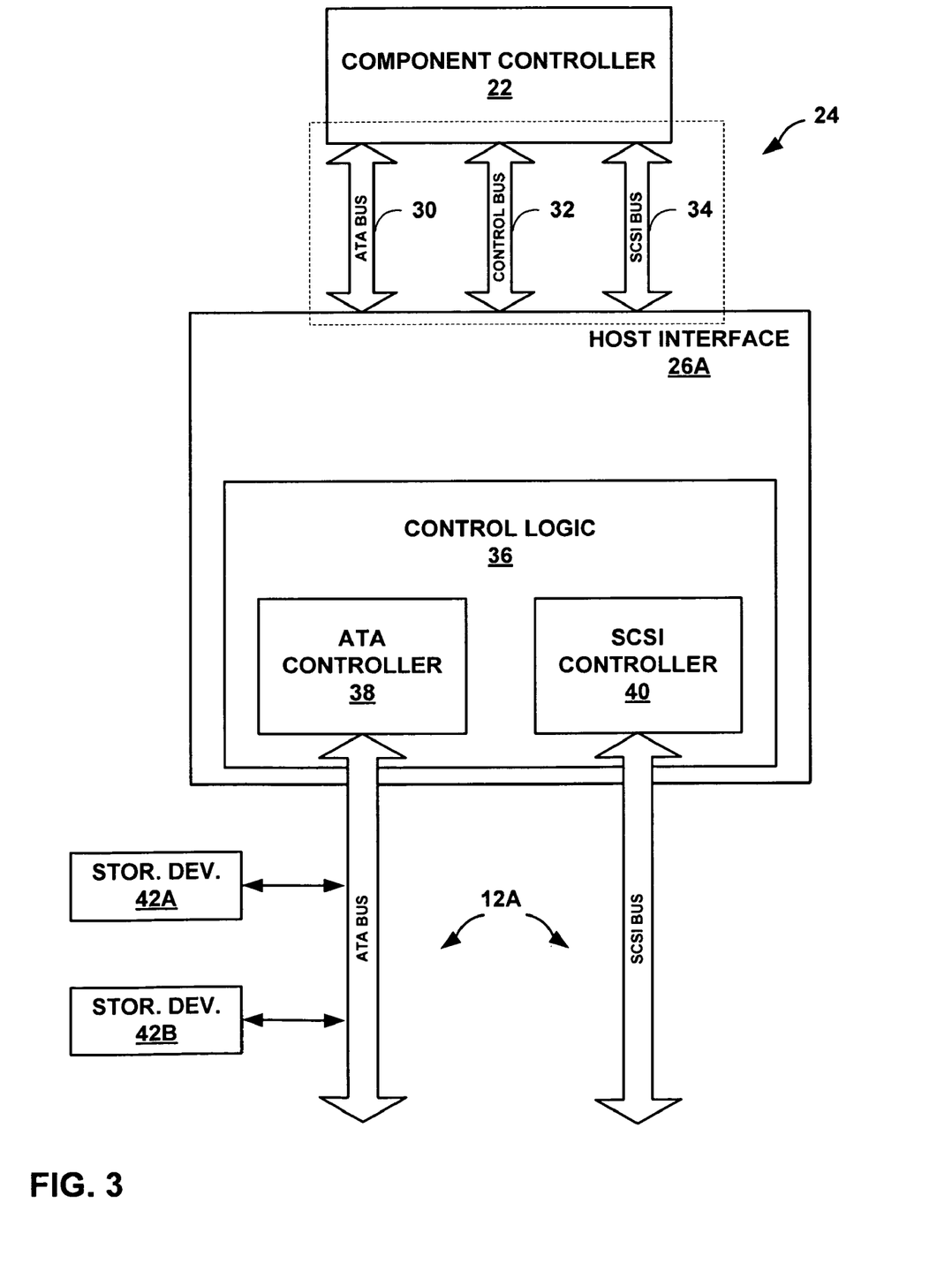
FIG. 3 is a block diagram illustrating an exemplary embodiment of a host interface of a data storage replication component.

FIG. 3 is a block diagram illustrating an exemplary embodiment of a host interface 26A of data storage replication component 4 (FIG. 2). As illustrated in FIG. 3, host interface 26A is coupled to component controller 22 via an ATA bus 30, a control bus 32, and a SCSI bus 34. Together, ATA bus 30, control bus 32, and SCSI bus 34 may comprise internal interconnect 24.

Host interface 26A includes control logic 36. Control logic 36 may, for example, be a ASIC or a portion of an ASIC. Control logic 36 of host interface 26A facilitates conversion of data storage instructions from one interconnect format to another. That is, control logic 36 handles all bus control logic for sending and receiving data storage instructions for all of internal interconnect 24 and for one or more external interconnects associated with the host interface. In this example, device interconnect 12A comprises two separate busses for which host interface 26A operates as a host. Thus, if host interface 26A acts as a host on an ATA bus and a SCSI bus, control logic 36 may logically be viewed as containing an ATA controller 38 and a SCSI controller 40.

As illustrated in FIG. 3, host interface 26A may act as a host to one of interconnects 12 where multiple data storage devices are coupled to the interconnect. For instance, host interface 26A could act as a host on a parallel ATA bus that includes a "master" data storage device 42A and a "slave" data storage device 42B. In addition, up to four data storage devices (not illustrated) may be coupled to a SATA bus. Similarly, up to fifteen data storage devices (not illustrated) may be coupled to a SCSI bus. For example, if more than one data storage device is coupled to interconnect 12A, control logic 36 may be programmed to instruct each data storage device on the interconnect to write the same data to each of the data storage devices coupled to interconnect 12A.

Figure 4:
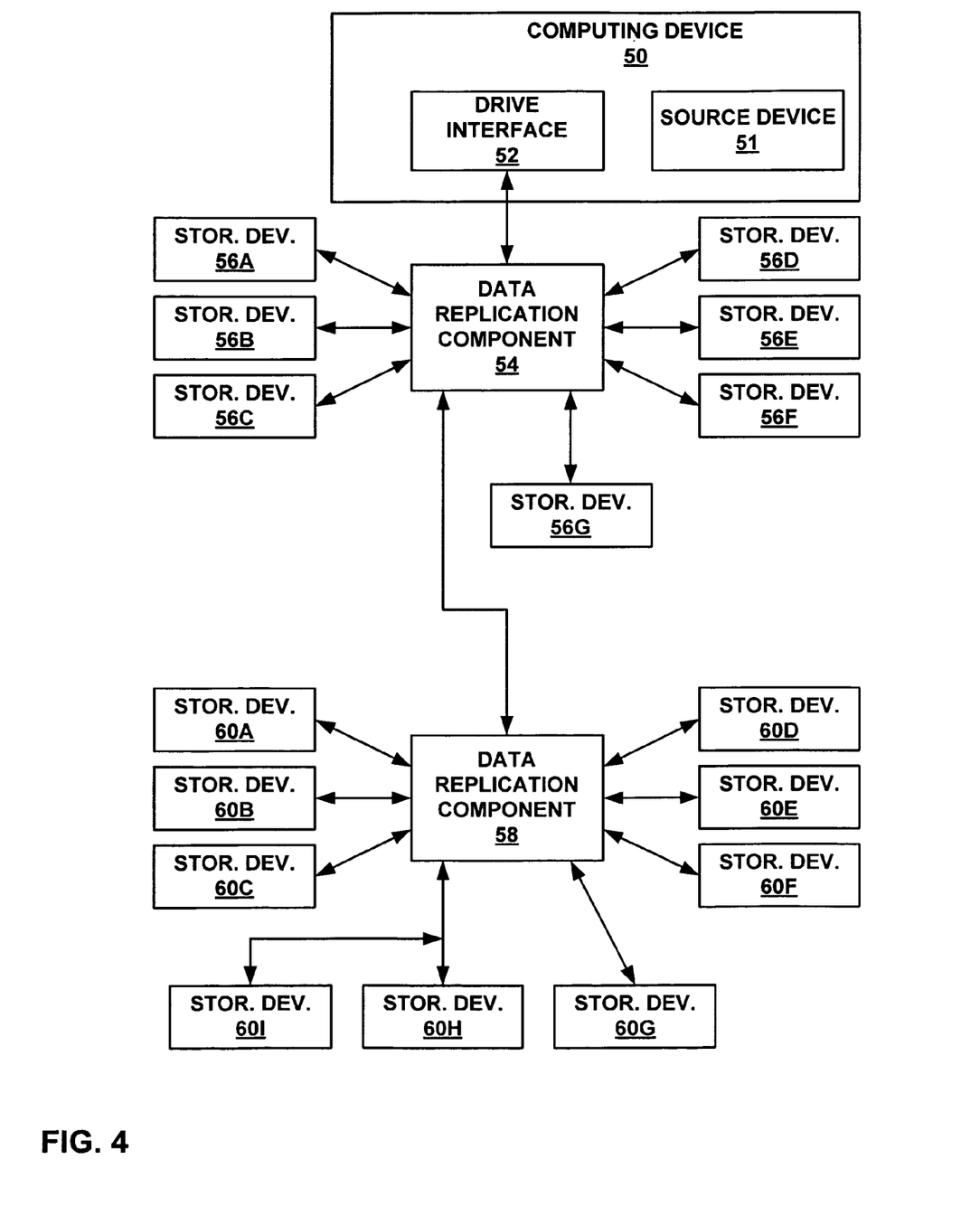
FIG. 4 is a block diagram illustrating an exemplary embodiment of a computing device having a plurality of scalable data storage replication components.

FIG. 4 is a block diagram illustrating an exemplary embodiment of a computing device 50 coupled to a plurality of scalable data storage replication components. In particular, computing device 50 may be similar to computing device 2 (FIG. 1) and may include an internal data storage device 51 that operates as a source for data provided to drive interface 52 for replication. Like computing device 2, computing device 50 contains a drive interface 52, which may be a conventional interface for an external (or internal) data storage device, and a first data storage replication component 54.

Data storage replication component 54 may be physically identical to data storage replication component 4 (FIGS. 1 and 2). In addition, various data storage devices 56A through 56G (collectively, data storage devices 56) may be coupled to data storage replication component 54 via independent device interconnects (i.e., busses) in a way that is similar to the way data storage devices 14A through 14H are coupled to data storage replication component 4 in FIGS. 1 and 2.

However, in computing device 50, data storage device 14H has been replaced with a second data storage replication component 58. Data storage replication component 58 may also be physically identical to data storage replication component 54. As illustrated in FIG. 4, data storage replication component 58 is coupled via a set of independent device interconnects to data storage devices 60A through 60I (collectively, data storage devices 60). Data storage replication component 58 acts as a host to each of data storage devices 60.

From the perspective of data storage replication component 54, data storage replication component 58 appears to be a single data storage device to which data is replicated. Moreover, from the perspective of data storage replication component 58, data storage replication component 54 appears to be a host from which data is received. For this reason, data storage replication component 54 may send instructions to data storage replication component 58 as though data storage replication component 58 was a data storage device. In other words, data storage replication component 58 responds to instructions from data storage replication component 54 as though data storage replication component 54 was an ordinary host.

When data storage replication component 58 receives instructions from data storage replication component 54, data storage replication component 58 may perform the same operations as data storage replication component 54. That is, data storage replication component 58 may output write instructions to each of data storage devices 60 coupled to data storage replication component 58 in a format that conforms to the particular interconnect. In this way, a write instruction from drive interface 52 may be carried out on all of data storage devices 56 and all of data storage devices 60 with substantial simultaneity.

It should be further noted that each of data storage devices 56 and data storage devices 60 may also be replaced with data storage replication components, each of which are programmed to operate as hosts for further data storage replication components or data storage devices. In addition, it should be appreciated that one or more additional data storage replication components (not illustrated) may be coupled to data storage replication component 58. In this way, a computing device may operate as a source for multiple data storage replication components that replicate data across a very large number of data storage devices. A hierarchical, tree-like configuration may be formed where a source (either a host computer or a root data storage replication component) is the root of the tree from which all replication data flows; the leaf nodes of the tree are the data storage devices; and any intermediate nodes are replicator devices programmed to operate as both hosts and data storage devices. Thus, data storage replication components supply a scalable solution that facilitates mass replication of data.

Figure 5:
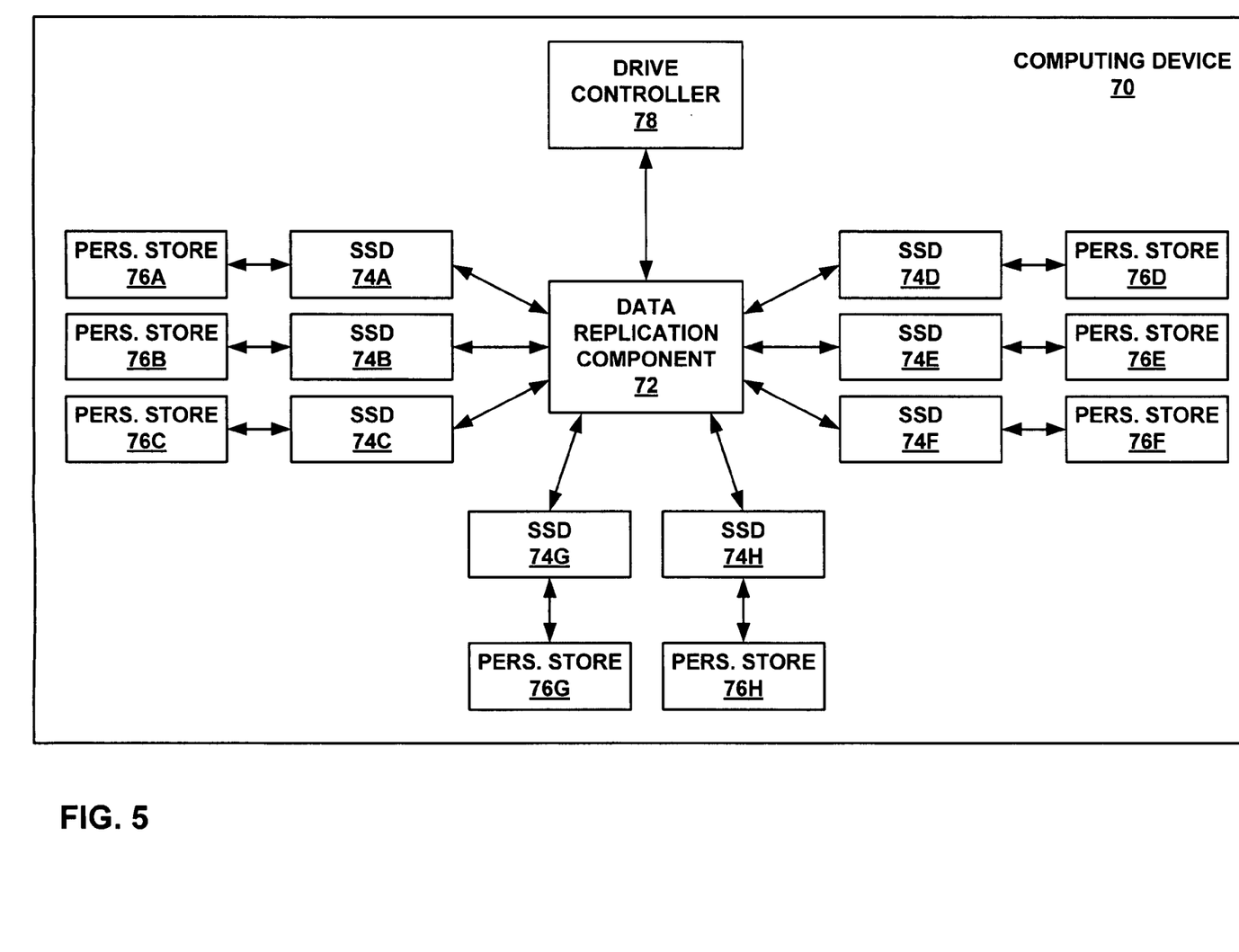
FIG. 5 is a block diagram illustrating an exemplary computing system having a scalable data storage replication component that stores data in a plurality of solid state disks (SSDs) and associated persistent storage.

FIG. 5 is a block diagram illustrating an exemplary computing device 70 having a data storage replication component 72 that stores data in SSDs 74A through 74H (collectively, SSDs 74). Data storage replication component 72 may be physically identical to and behave like data storage replication component 4 (FIG. 1).

In this example, each of SSDs 74 includes blocks of random access memory (RAM). For example, SSD 74A may include a block of eight gigabytes of RAM. Each of SSDs 74 is coupled to one or more of persistent storage devices 76A through 76H (collectively, persistent storage devices 76). For instance, persistent storage devices 76 may be hard-disk drives. When computing device 70 shuts down, loses power, or otherwise terminates operations, SSDs 74 write the content of their respective blocks of RAM to their respective one of persistent storage devices 76. For instance, SSD 74A writes the content of its block of RAM to persistent storage device 76A. In this way, SSDs 74 may combine the speed of RAM access with the permanence of a persistent storage device.

Because SSDs 74 are coupled to data storage replication component 72, each of SSDs 74 may receive instructions from a host 78 in computing device 70. By programming each of SSDs 74 to obey instructions with particular address ranges, the combination of data storage replication component 72 with SSDs 74 may act as a single, large SSD. Thus, if each of SSDs 74 included an eight gigabyte block of RAM, the combination of data storage replication component 72 with SSDs 74 would be equivalent to an SSD with a 64 gigabyte block of RAM. Further, if two SSDs are coupled to each device interconnect from data storage replication component 72 (as is possible with parallel ATA busses) the combination of these SSDs and data storage replication component 72 may be equivalent to an SSD with a 128 gigabyte block of RAM. In addition, the technique applied in FIG. 4 may be applied to create a larger, virtual SSD. That is, one or more of SSDs 74 may be replaced with an additional data storage replication component to which one or more SSDs are coupled.

Each of SSDs 74 may store multiple images on their respective ones of persistent storage devices 76. In this way, each of SSDs 74 may virtually store multiple blocks of RAM. As a result, SSDs may store more data and may be able to retrieve data more quickly than conventional data storage devices.

Various embodiments of the invention have been described. These and other embodiments are within the scope of the following claims.

The invention claimed is:

1. A data replication system comprising:
a host to output data;
a plurality of data storage devices capable of persistent storage of the data;
a data storage replication component comprising:
  (i) a primary interface programmable to mimic behavior of a data storage device to receive the data from the host data storage device,
  (ii) a plurality of host interfaces, wherein each of the host interfaces mimics behavior of a host for outputting the data to the plurality of data storage devices; and
  (iii) an internal interconnect for communication between the primary interface and each of the host interfaces; and
an external interconnect to facilitate communication between the host and the primary interface of the data storage replication component,
wherein the data storage replication component replicates the data received from the primary interface to each data storage device in the plurality of data storage devices, and
wherein the internal interconnect comprises an asynchronous register access path and a synchronous data path.

2. The data replication system of claim 1, wherein the data storage replication component outputs read, write, and control instructions to replicate the data received from the primary interface to data storage devices in the plurality of data storage devices.

3. The data replication system of claim 1 wherein the host interfaces operate to mimic the behavior of data storage devices on the internal interconnect of the data storage replication component.

4. The data replication system of claim 1,
wherein the primary interface acts as a host on the internal interconnect that couples the primary interface to the host interfaces; and
wherein the primary interface acts as a device on the external interconnect.

5. The data replication system of claim 1,
wherein the internal interconnect of the data storage replication component further comprises a first shared bus and a second shared bus that couple the primary interface and the host interfaces of the data storage replication component, wherein the second shared bus is a different bus type than the first shared bus.

6. The data replication system of claim 5,
wherein the first shared bus is an Advanced Technology Attachment (ATA) bus and second shared bus is a Small Computer System Interface (SCSI).

7. The data replication system of claim 1,
wherein the external interconnect and at least one of a plurality of interconnects that couple the host interfaces of the data storage replication component and the data storage devices, are of different data storage bus formats.

8. The data replication system of claim 1,
wherein two or more data storage devices in the plurality of data storage devices are coupled to a same one of the host interfaces of the data storage replication component.

9. The data replication system of claim 1,
wherein the data storage replication component further comprises a component controller to convert instructions in an interconnect format of the external interconnect into one or more instructions in an interconnect format of the internal interconnect.

10. The data replication system of claim 1,
wherein the data storage replication component is a first data storage replication component and wherein the plurality of data storage devices is a first plurality of data storage devices;
wherein the system further comprises:
  a second data storage replication component operating to mimic a data storage device;
  an interconnect coupling the first data storage replication component and the second data storage replication component;
  a second plurality of data storage devices; and
wherein the second data storage replication component replicates the data received from the first data storage component to each data storage device in the second plurality of data storage devices.

11. The data replication system of claim 10,
wherein the first data storage replication component, the first plurality of data storage devices, the second data storage replication component, and the second plurality of data storage devices are arranged in a tree configuration where the host is a root of the tree, the first and second plurality of data storage devices are leaf nodes of the tree, and the first and second data storage replication components are intermediate nodes of the tree.

12. The data replication system of claim 1,
wherein one or more data storage devices in the plurality of data storage devices comprise solid state disks (SSDs).

13. The data replication system of claim 12,
wherein a combination of the data storage replication component and the SSDs acts as a single virtual SSD.

14. The data replication system of claim 1,
wherein the data storage replication component replicates the data received from the primary interface to each data storage device in the plurality of data storage devices with substantial simultaneity.

15. The data replication system of claim 1, wherein the host comprises a dedicated duplication device.

16. The data replication system of claim 1, wherein the data storage replication component initializes the plurality of data storage devices.

17. The data replication system of claim 16, wherein the data storage replication component initializes the plurality of data storage devices without reading from a source drive.

18. The data replication system of claim 1, wherein the asynchronous register access path comprises a bi-directional data bus, an address bus, a control bus, and a disk address bus.

19. The data replication system of claim 1, wherein the synchronous data path comprises a Direct Memory Access bus, control signals, and a common clock.

20. A data replication system comprising:
a host to output data;

a plurality of data storage devices capable of persistent storage of the data;

a data storage replication component comprising:
  (i) a primary interface programmable to mimic behavior of a data storage device to receive the data from the host data storage device;
  (ii) a plurality of host interfaces, wherein each of the host interfaces inks behavior of a host for outputting the data to the plurality of data storage devices; and
  (iii) an internal interconnect for communication between the primary interface and each of the host interfaces; and an external interconnect to facilitate communication between the host and the primary interface of the data storage replication component, wherein the data storage replication component replicates the data received from the primary interface to each data storage device in the plurality of data storage devices, wherein the data replication component comprises a plurality of data queues associated with respective ones the data storage devices, wherein each of the data queues is associated with a flag indicating whether the data queues are full; and wherein when the data storage replication component initializes the plurality of data storage devices, the data storage replication components sets the flag to indicate that the data queues are never full.

* * * * *